United States Patent
Baer

(10) Patent No.: US 7,216,678 B2
(45) Date of Patent: May 15, 2007

(54) SELF-CURLING SLEEVE

(75) Inventor: Angela L. Baer, Westminster, MD (US)

(73) Assignee: Federal Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 11/185,589

(22) Filed: Jul. 20, 2005

(65) Prior Publication Data

US 2006/0016507 A1 Jan. 26, 2006

Related U.S. Application Data

(60) Provisional application No. 60/589,270, filed on Jul. 20, 2004, provisional application No. 60/657,847, filed on Mar. 2, 2005.

(51) Int. Cl.
*D03D 3/00* (2006.01)
*D03D 3/02* (2006.01)
*D03D 15/04* (2006.01)
*D03D 3/08* (2006.01)
*D03D 15/02* (2006.01)

(52) U.S. Cl. ............................. 139/384 R; 139/383 R; 139/386; 139/387 R; 139/390; 139/420 R

(58) Field of Classification Search ............ 139/383 R, 139/384 R, 386, 387 R, 390, 388, 420 R, 139/421, 422, 426 R, DIG. 1
See application file for complete search history.

(56) References Cited

U.S. PATENT DOCUMENTS

| | | | | |
|---|---|---|---|---|
| 2,333,352 A | * | 11/1943 | Wintriss | 29/410 |
| 3,466,210 A | * | 9/1969 | Wareham | 156/86 |
| 4,107,381 A | * | 8/1978 | Butzow et al. | 428/365 |
| 4,174,739 A | * | 11/1979 | Rasero et al. | 139/388 |
| 4,929,478 A | * | 5/1990 | Conaghan et al. | 428/35.1 |
| 5,178,923 A | * | 1/1993 | Andrieu et al. | 428/36.1 |
| 5,229,176 A | * | 7/1993 | Freeman | 428/34.7 |
| 5,300,337 A | * | 4/1994 | Andrieu et al. | 428/36.1 |
| 5,358,492 A | * | 10/1994 | Feibus | 604/264 |
| 5,467,802 A | * | 11/1995 | Lusen et al. | 139/384 R |
| 5,609,701 A | * | 3/1997 | Soderberg et al. | 152/543 |
| 5,843,542 A | * | 12/1998 | Brushafer et al. | 428/36.1 |
| 6,328,080 B1 | * | 12/2001 | Winters | 139/388 |
| 6,510,872 B1 | * | 1/2003 | Smith et al. | 139/383 R |
| 6,709,552 B2 | * | 3/2004 | Sakuma et al. | 162/358.4 |
| 6,751,831 B2 | * | 6/2004 | Willauer et al. | 28/167 |
| 6,790,213 B2 | * | 9/2004 | Cherok et al. | 606/151 |
| 6,854,298 B2 | | 2/2005 | Relats et al. | |
| 6,963,031 B2 | * | 11/2005 | Gladfelter et al. | 174/74 A |
| 7,025,063 B2 | * | 4/2006 | Snitkin et al. | 128/885 |

* cited by examiner

*Primary Examiner*—Robert H Muromoto
(74) *Attorney, Agent, or Firm*—Robert L. Stearns; Dickinson Wright PLLC

(57) ABSTRACT

A substrate including a plurality of monofilaments, or a combination of monofilaments and multi-filament yarns oriented in perpendicular directions, has a tendency to curl around a central space. When all monofilaments are used, the monofilaments along one direction may have a larger diameter than the monofilaments along the other direction. The monofilaments are woven such that the larger diameter monofilaments form floats predominantly on one side of the substrate. For the monofilament-multifilament combination the monofilaments form floats predominantly on one side of the substrate. The substrate curls about an axis parallel to the monofilaments forming the floats. The side having the floats faces outwardly away from the central space. Preferably, the monofilaments are oriented in the warp direction along the substrate. The filaments may be woven in a herringbone twill weave, a double cloth herringbone twill weave or a satin weave to provide the floats.

25 Claims, 10 Drawing Sheets

FIG.4

(ENDS/WARPS) HARNESS →

| | | | 1 | 2 | 3 | 4 | 5 | 6 | 7 | 8 | 9 | 10 |
|---|---|---|---|---|---|---|---|---|---|---|---|---|
| | | | T | B | T | B | T | B | T | B | T | B |
| T | 1 | E | | | | × | | | | × | | |
| B | 2 | M | | | | | | × | | | | × |
| T | 3 | P | | | | | × | | | | × | |
| B | 4 | T | | × | | | | | × | | | |
| T | 5 | Y | | | × | | | | | × | | |
| B | 6 | E | | | | × | | | | × | | |
| T | 7 | E | M | | | | | × | | | | × |
| B | 8 | M | P | | × | | | | | × | | |
| T | 9 | P | T | | | × | | | | | × | |
| B | 10 | T | Y | × | | | | × | | | | |
| T | 11 | Y | | | | | | | × | | | × |
| B | 12 | E | | | × | | | | | × | | |
| T | 13 | E | M | | | × | | | | | × | |
| B | 14 | M | P | × | | | × | | | | | |

PICKS (left axis)

AS A FABRIC (ENDS/WARPS) HARNESS →

| | | | 1 | 2 | 3 | 4 | 5 | 6 | 7 | 8 | 9 | 10 |
|---|---|---|---|---|---|---|---|---|---|---|---|---|
| | | | T | B | T | B | T | B | T | B | T | B |
| T | 1 | E | | × | × | × | × | × | × | × | × | × |
| B | 2 | M | × | × | × | × | × | × | × | × | × | × |
| T | 3 | P | × | × | × | × | × | × | × | × | × | × |
| B | 4 | T | × | × | × | × | × | × | × | × | × | × |
| T | 5 | Y | × | × | × | × | × | × | × | × | × | × |
| B | 6 | E | × | × | × | × | × | × | × | × | × | × |
| T | 7 | E M | × | × | × | × | × | × | × | × | × | × |
| B | 8 | M P | × | × | × | × | × | × | × | × | × | × |
| T | 9 | P T | × | × | × | × | × | × | × | × | × | × |
| B | 10 | T Y | × | × | × | × | × | × | × | × | × | × |
| T | 11 | Y | × | × | × | × | × | × | × | × | × | × |
| B | 12 | E | × | × | × | × | × | × | × | × | × | × |
| T | 13 | E M | × | × | × | × | × | × | × | × | × | × |
| B | 14 | M P | × | × | × | × | × | × | × | × | × | × |

PICKS (left axis)

AS A FABRIC

(ENDS/WARPS)
HARNESS →

| | | | 1 | 2 | 3 | 4 | 5 | 6 | 7 | 8 | 9 | 10 |
|---|---|---|---|---|---|---|---|---|---|---|---|---|
| | | | T | B | T | B | T | B | T | B | T | B |
| T | 1 | E | | | ✕ | | | | ✕ | | | |
| B | 2 | M | | | | ✕ | | | | ✕ | | |
| T | 3 | P | | | | | ✕ | | | | ✕ | |
| B | 4 | T | | | | | | ✕ | | | | ✕ |
| T | 5 | Y | | | ✕ | | | | ✕ | | | |
| B | 6 | | E | | | ✕ | | | | ✕ | | |
| T | 7 | E | M | ✕ | | | | ✕ | | | | |
| B | 8 | M | P | | ✕ | | | | ✕ | | | |
| T | 9 | P | T | | | ✕ | | | | ✕ | | |
| B | 10 | T | Y | | | | ✕ | | | | ✕ | |
| T | 11 | Y | | | | ✕ | | | | ✕ | | |
| B | 12 | | E | | | | ✕ | | | | ✕ | |
| T | 13 | E | M | ✕ | | | | ✕ | | | | |
| B | 14 | M | P | | ✕ | | | | ✕ | | | |

PICKS (vertical label)

AS A FABRIC

FIG. 7

(ENDS/WARPS)
HARNESS →

| | | | 1 | 2 | 3 | 4 | 5 | 6 | 7 | 8 | 9 | 10 |
|---|---|---|---|---|---|---|---|---|---|---|---|---|
| | | | T | B | T | B | T | B | T | B | T | B |
| T | 1 | E | | | ✕ | ✕ | ✕ | ✕ | ✕ | ✕ | ✕ | ✕ |
| B | 2 | M | | | | ✕ | ✕ | ✕ | ✕ | ✕ | ✕ | ✕ |
| T | 3 | P | | | ✕ | | ✕ | ✕ | ✕ | ✕ | ✕ | ✕ |
| B | 4 | T | | | ✕ | ✕ | | ✕ | ✕ | ✕ | ✕ | ✕ |
| T | 5 | Y | | | ✕ | ✕ | ✕ | | ✕ | ✕ | ✕ | ✕ |
| B | 6 | | E | | ✕ | ✕ | ✕ | ✕ | | ✕ | ✕ | ✕ |
| T | 7 | E | M | ✕ | | ✕ | ✕ | ✕ | ✕ | | ✕ | ✕ |
| B | 8 | M | P | ✕ | ✕ | | ✕ | ✕ | ✕ | ✕ | | ✕ |
| T | 9 | P | T | ✕ | ✕ | ✕ | | ✕ | ✕ | ✕ | ✕ | |
| B | 10 | T | Y | ✕ | ✕ | ✕ | ✕ | | ✕ | ✕ | ✕ | ✕ |
| T | 11 | Y | | | ✕ | ✕ | ✕ | ✕ | ✕ | | ✕ | ✕ |
| B | 12 | | E | | ✕ | ✕ | ✕ | ✕ | ✕ | ✕ | | ✕ |
| T | 13 | E | M | ✕ | | ✕ | ✕ | ✕ | ✕ | ✕ | ✕ | |
| B | 14 | M | P | ✕ | ✕ | | ✕ | ✕ | ✕ | ✕ | ✕ | ✕ |

PICKS (vertical label)

AS A FABRIC

FIG. 8

(ENDS/WARPS)
HARNESS →

| | | | 1 | 2 | 3 | 4 | 5 | 6 | 7 | 8 | 9 | 10 |
|---|---|---|---|---|---|---|---|---|---|---|---|---|
| | | | T | B | T | B | T | B | T | B | T | B |
| T | 1 | | E | | | X | | | | | X | |
| B | 2 | | M | | | | | X | | | | |
| T | 3 | | P | | X | | | | | X | | |
| B | 4 | | T | | | | X | | | | | X |
| T | 5 | | Y | | | | | | X | | | |
| B | 6 | | | E | | X | | | | | | X |
| T | 7 | | E | M | | | | X | | | | |
| B | 8 | | M | P | | X | | | | | X | |
| T | 9 | | P | T | | | X | | | | | |
| B | 10 | | T | Y | X | | | | | X | | |
| T | 11 | | Y | | | | X | | | | | X |
| B | 12 | | | E | | | | | X | | | |
| T | 13 | | E | M | | | X | | | | | X |
| B | 14 | | M | P | | | | | X | | | |

AS A FABRIC    5-FLOAT FILLING FACED SATIN

FIG.9

AS A DOUBLE CLOTH

FIG. 10

(ENDS/WARPS)
HARNESS →

| | | | 1 | 2 | 3 | 4 | 5 | 6 | 7 | 8 | 9 | 10 |
|---|---|---|---|---|---|---|---|---|---|---|---|---|
| | | | T | B | T | B | T | B | T | B | T | B |
| T | 1 | E | | | X | X | X | X | X | X | | |
| B | 2 | M | | | X | | X | | X | | X | | |
| T | 3 | P | | | | X | | X | | X | | | X |
| B | 4 | T | | | X | X | X | X | X | | | | |
| T | 5 | Y | | | X | | X | | X | | X | | |
| B | 6 | | E | X | | X | | X | | X | | | |
| T | 7 | E | M | X | X | X | X | X | X | | | | |
| B | 8 | M | P | X | | X | | X | | X | | X | |
| T | 9 | P | T | X | X | | X | | X | | X | | |
| B | 10 | T | Y | X | | X | | X | | X | | X | |
| T | 11 | Y | | | | X | | X | | X | | | X |
| B | 12 | | E | X | X | | X | | X | | X | | |
| T | 13 | E | M | X | X | X | X | X | X | | | | |
| B | 14 | M | P | X | X | X | X | X | X | X | | | |

AS A FABRIC

FIG.12

| HARNESS | | | | | | | | | | | PLAIN WV. | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |

P I C K

P I C K

LONGITUDINAL WRAP

FIG.13

| HARNESS | | | | | | | | | | | PLAIN WV. | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| P | | | X | | | | | | | X | X | | | | | |
| I | | | | X | | | | | X | | | X | | | | |
| C | | | | | X | | | X | | | | | X | | | | |
| K | | | | | | X | X | | | | | | | X | | | |
| | | | | | | X | X | | | | | | | X | | | |
| | | | | X | | | X | | | | | | X | | | | |
| | | | X | | | | X | | | | | X | | | | | |
| | | | X | | | | | | | X | X | | | | | |

LONGITUDINAL WRAP (A.K.A. COIL WRAP)

| HARNESS | | | | | | | | | | | PLAIN WV. | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| P | | | X | | | | X | | | | X | | | | | |
| I | | | | X | | | | X | | | | X | | | | |
| C | | | | | X | | | | X | | | | X | | | | |
| K | | | | | | X | | | | X | | | | X | | | |
| | | | X | | | | X | | | | X | | | | | | |
| | | | | X | | | | X | | | | X | | | | | |
| | | | | | X | | | | X | | | | X | | | | |
| | | | | | | X | | | | X | | | | X | | | |

HELICAL WRAP

FIG.14

SELF-CURLING SLEEVE

CROSS-REFERENCE TO RELATED APPLICATIONS

This application claims the benefit of U.S. Provisional Patent Application Nos. 60/589,270, filed Jul. 20, 2004, and 60/657,847, filed Mar. 2, 2005, the entire disclosures of both of which are hereby incorporated herein by reference.

FIELD OF THE INVENTION

This invention concerns sleeves for receiving and protecting elongated items, such as wiring harnesses.

BACKGROUND OF THE INVENTION

Protective sleeving is used throughout the automotive, marine and aerospace industries to organize and protect elongated items, such as wiring harnesses and optical fiber cables. The sleeving surrounds the elongated items and protects them against cuts, abrasion, radiant heat, vibration induced wear and other harsh environmental threats. When positioned within protective sleeving, the wiring or cables are also held together in a neat bundle, allowing a multiplicity of different items to be handled like a sub-assembly, thus saving time and effort during integration of the items into a product.

Protective sleeving may be made by weaving filaments into a substrate and then resiliently biasing the substrate into a tubular form to define a central space for receiving the elongated items. Biasing may be effected by various means appropriate to the types of yarns used to make the substrate. Polymer filaments may be biased by heating them when the substrate is wrapped about a cylindrical mandrel, the filaments taking a permanent set conforming to the shape of the mandrel. Filaments can also be resiliently biased into a curved shape by chemical means as well as by cold working.

When substrates are biased into a tubular shape, monofilaments are typically oriented in the "hoop" or circumferential direction of the tube. Monofilaments provide excellent stiffness and strong resilient biasing that maintains the substrate in the tubular shape and tends to restore the substrate to this shape in the absence of distorting forces such as occur when the sleeve is manipulated to insert or remove an elongated item.

A significant disadvantage associated with sleeves that are biased into a tubular shape is that the biasing is effected by a separate step in the process of making the sleeve. The filaments comprising the sleeve may be biased by cold working before weaving or may be biased after weaving by heating the substrate when wrapped about a mandrel, but these actions constitute a separate step that adds to the cost and the time required to produce the sleeve. It would be advantageous to provide a sleeve formed from a substrate that is self-curling and needs no separate step to effect resilient biasing of the filaments into the tubular shape.

SUMMARY OF THE INVENTION

The invention concerns a self-curling sleeve for receiving and protecting elongated items. The sleeve comprises a substrate woven from a plurality of monofilaments or a combination of monofilaments and multi-filament yarns. When all monofilaments are used, the monofilaments along one direction may have a larger diameter than the monofilaments along the other direction. For the combination embodiment, the monofilaments are oriented along a first direction and the multifilament yarns are oriented along a second direction substantially perpendicular to the first direction. The monofilaments are woven such that the larger diameter monofilaments form floats predominantly on one side of the substrate. For the monofilament-multifilament combination the monofilaments form floats predominantly on one side of the substrate. The substrate curls about an axis parallel to the monofilaments forming the floats to define and surround a central space. The side having the floats faces outwardly away from the central space. In a certain embodiment, the longitudinal floats face outwardly, and the horizontal floats face inwardly.

Relatively more rigid filaments are preferably located in the warp direction, and relatively less rigid filaments are preferably located in the weft direction. Preferably, the monofilament yarns are oriented in the warp direction along the substrate. For the combination of monofilaments and multifilaments, the monofilaments are preferably oriented in the warp direction.

The filaments may be woven in a herringbone twill weave, a double cloth herringbone twill weave or a satin weave to provide the floats.

BRIEF DESCRIPTION OF THE DRAWINGS

The present invention will now be described by way of example with reference to the following drawings in which:

FIGS. 4–10 are schematic diagrams describing weave patterns used for the self-curling sleeve according to the invention;

FIGS. 12–14 are schematic diagrams describing weave patterns used for the self-curling sleeve according to the invention.

DETAILED DESCRIPTION

Figure 1:
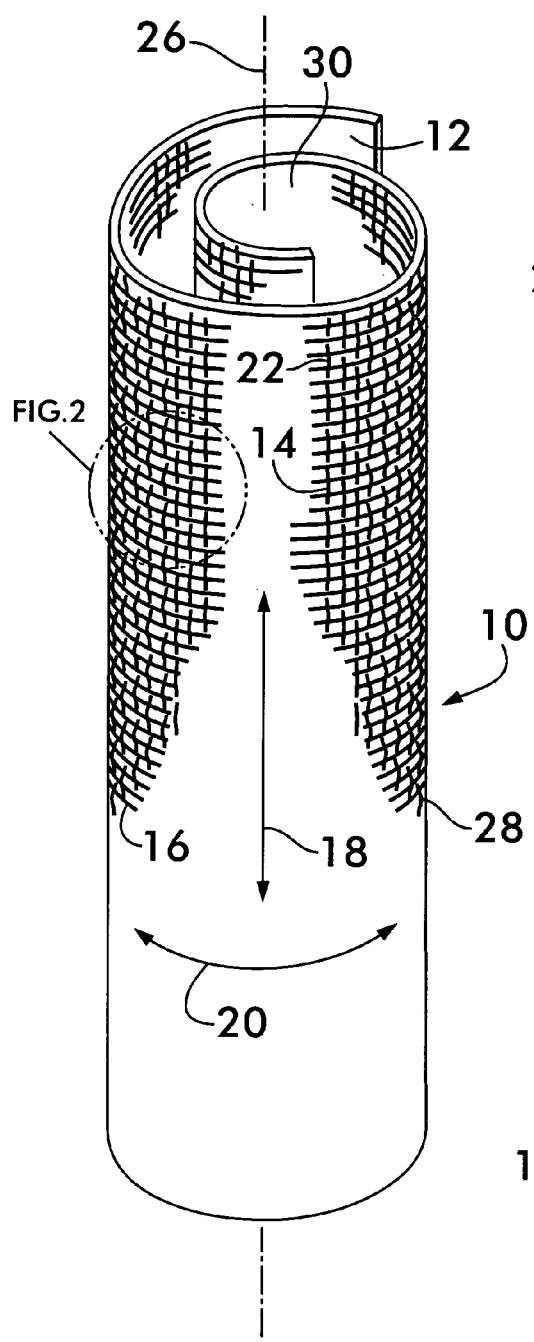
FIG. 1 is a perspective view of a self-curling sleeve according to the invention.

FIG. 1 shows a self-curling sleeve 10 according to the invention. Sleeve 10 comprises a substrate 12 woven from a plurality of monofilaments 14 and multifilament yarns 16. The monofilaments 14 are oriented in a first direction, shown by arrow 18, and the multifilament yarns 16 are oriented in a second direction, substantially perpendicular to the first direction, and indicated by arrow 20. Preferably, the monofilaments 14 are oriented in the warp direction of the substrate and the multifilament yarns are oriented in the weft direction and constitute the "fill yarns" or "picks" of the weave.

Figure 2:
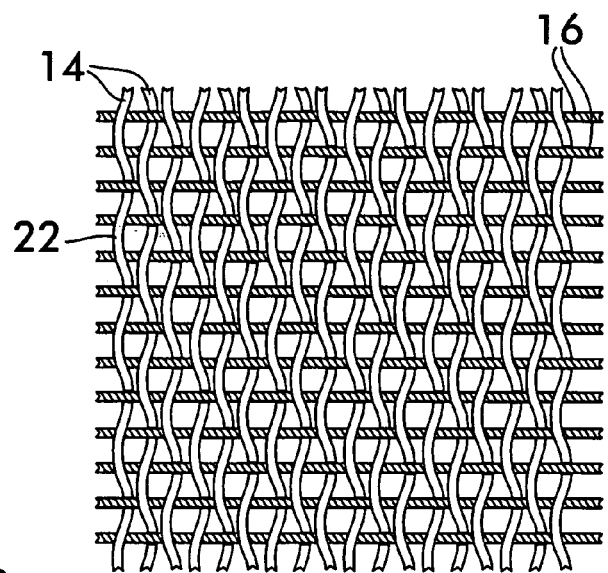
FIG. 2 is a perspective view of a warp faced substrate.
Figure 3:
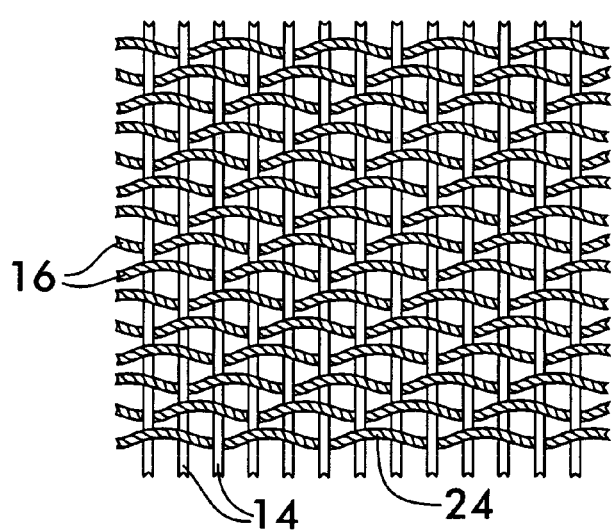
FIG. 3 is a perspective view of a filling faced substrate.

Preferred weave patterns for weaving the substrate 12 are those such as twills and satin weaves that form "floats" predominantly on one side of the substrate. As shown in FIG. 2, a "float" 22 is formed when a filament or yarn, such as monofilament 14, crosses over more than one filament or yarn oriented perpendicular to it, such as weft yarns 16. The substrate is called "warp faced" when woven with a predominance of warp yarn floats on the surface of the substrate, as illustrated in FIG. 2. A "filling faced" substrate, where filling yarn floats 24 predominate on the surface of the fabric is shown in FIG. 3.

As shown in FIG. 1, the substrate 12, whether warp-faced or filling faced, when woven with monofilaments 14 in the warp direction and multifilament yarns 16 in the weft direction, exhibits a pronounced tendency to curl about an axis 26 substantially parallel to the monofilaments 14. The direction of curl is away from the surface having the floats 22, i.e., the substrate 12 naturally curls about axis 26 such that the floats 22 formed by the monofilaments 14 are on what becomes the outside surface 28 of the sleeve 10. Upon curling, the substrate 12 takes on a tubular shape and defines a central space 30 for receiving the elongated items.

The reason for the curling of this exemplary substrate 12 is thought to arise from at least two factors. First, the relatively stiff members (e.g., monofilaments 14) are oriented in the warp direction, while the more flexible and pliant members (e.g., multifilament yarns 16) are oriented in the weft direction. Accordingly, it has been found that the sleeve is self-curling when the filamentary members in the warp direction have greater beam strength than those in the weft.

With reference to the embodiment of FIG. 1, monofilaments in the warp direction stiffen the substrate 12 along the longitudinal axis 26, provide rigidity to the sleeve 10 and resist bending. In contrast, the more flexible multifilament yarns 16, oriented in the weft direction, are pliant and bend easily to allow the substrate 12 to curl about axis 26, the bending axis for the multifilament weft yarns 16. Multifilament yarns having deniers from about 200 to about 2000 are feasible.

The second factor causing substrate curling is related to the floats 22 which are thought to generate the forces that induce the substrate to curl. As noted above, the substrate 12 curls away from the surface 28 having floats 22. The substrate 12 is unbalanced in the sense that one surface is different from the other in that on one surface floats 22 predominate. This surface imbalance causes internal stresses throughout the substrate which cumulatively manifest themselves in a curvature of the substrate about axis 26.

It is further thought that the repeating chevron pattern that is apparent in herringbone twill weaves adds to the strength of the curl, because it is observed that substrates woven in warp and weft faced herringbone twill patterns show a greater tendency to curl than substrates formed from satin weaves. Although the satin weaves have floats, they do not display the chevron pattern associated with the herringbone twill and do not manifest the curling tendency to the same degree as the herringbone twill substrates.

FIGS. 4–10 illustrate various weave patterns that form substrates that curl when the warp members comprise monofilaments 14 and the weft members comprise multifilament yarns 16. Because it is difficult to clearly illustrate the actual woven substrate, weave patterns are preferably schematically illustrated using a matrix. The matrix represents a repeating weave pattern. The columns of the matrix represent the warp members and the rows represent the fill or weft members. Each square of the matrix represents the member that appears on the upper surface of the fabric as woven on the loom. An "X" in a square represents a cross-over point at which the corresponding warp member crosses over a corresponding weft or filling member. The upper surface is not necessarily the outer surface of the sleeve 10, as that will be determined by on which side the floats predominate.

FIGS. 4 and 5 represent simple herringbone twill patterns, FIG. 4 being filling faced and FIG. 5 being warp faced. Both of these weave patterns produce substrates having a relatively strong tendency to curl about the warp axis.

FIGS. 6 and 7 are more complex herringbone weaves in that they differ from FIGS. 4 and 5 at columns 4 and 8 where there are four extra warp cross-overs on the surface for the filling faced pattern (FIG. 6) or two extra weft cross-overs for the warp faced pattern (FIG. 7) as well as a greater frequency of the repeated pattern. Substrates woven with this pattern tend to show weaker tendency to curl than the simple herringbone patterns of FIGS. 4 and 5.

FIG. 8 shows a satin weave. Substrates woven from this pattern show a weaker tendency to curl than the complex herringbone pattern of FIGS. 6 and 7. Note that the chevron pattern characteristic of the herringbone weave is largely absent from the satin weave shown in FIG. 8.

Figure 9:
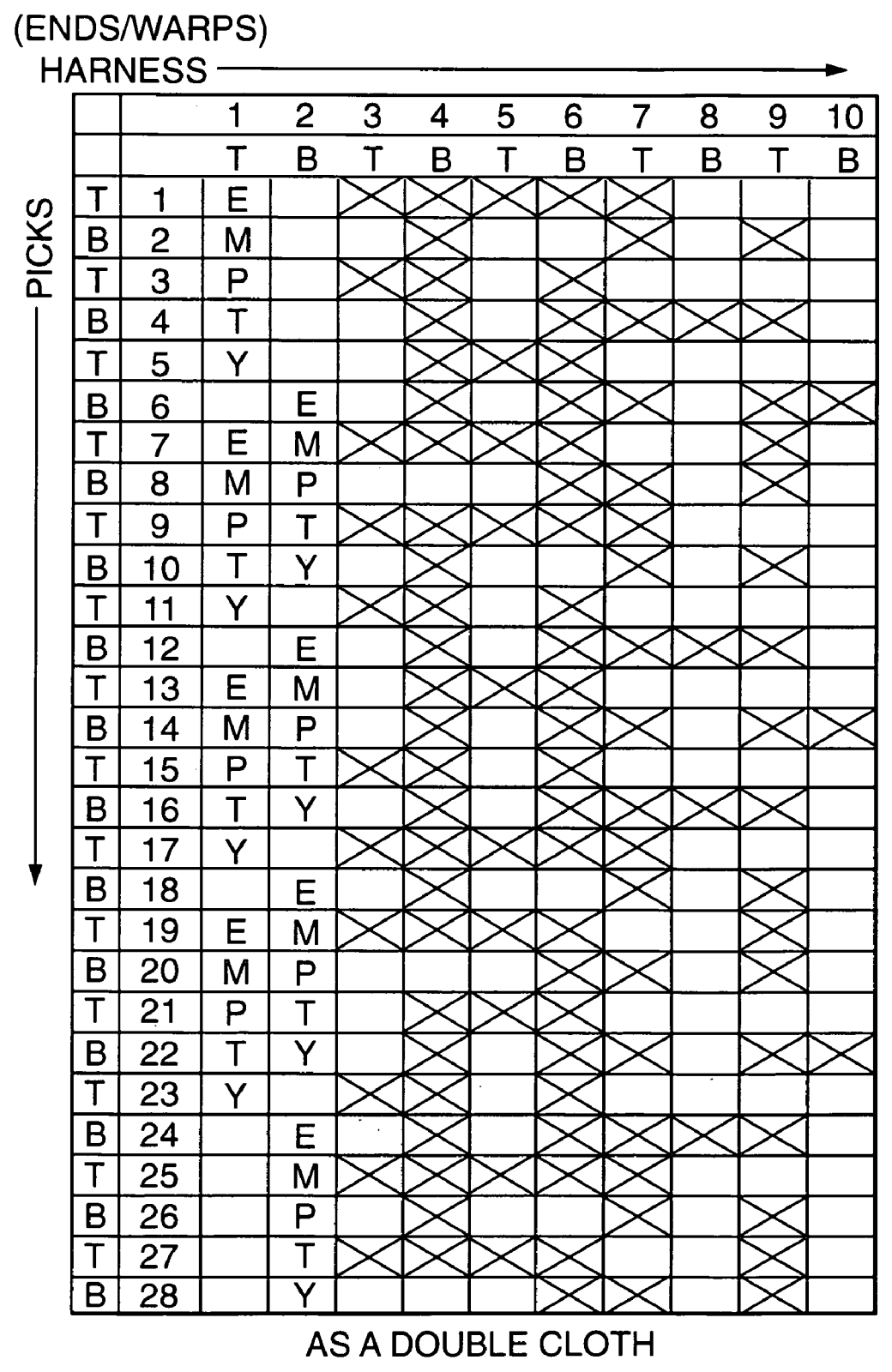

By far, the strongest tendency to curl is manifest in substrates woven according to the herringbone double cloth pattern shown in FIG. 9. Double cloth is a compound fabric in which a face cloth and a back cloth, each with its own warp and filling, are combined during weaving. Although the aforementioned chevron pattern is not readily visible in FIG. 9, which shows the double cloth weave, when shown as fabric comprising the double cloth, as in FIG. 10, the chevron pattern of the fabrics is clearly manifest.

Preferred materials for both the monofilaments and multifilament yarns include synthetic polymers such as polyester, polypropylene and aramids such as Kevlar and nylon. It is also feasible to use materials such as stainless steel, nitinol, elgiloy or other resilient metals having a high yield stress, preferably for the warp monofilaments.

Self-curling substrates according to the invention provide a sleeve that takes a tubular shape without the need for a separate biasing step. Such sleeves may be used to ensheath elongated items and may rely on their inherent resilient biasing to contain the items within a central space, or closing means, such as tape, may be used as a wrap to further secure the sleeve. The sleeve may also be outfitted with other closure means, such as lacing, hook and loop fasteners, buttons, zippers and the like which allow easy application and removal of the sleeve to a substrate.

Figure 11:
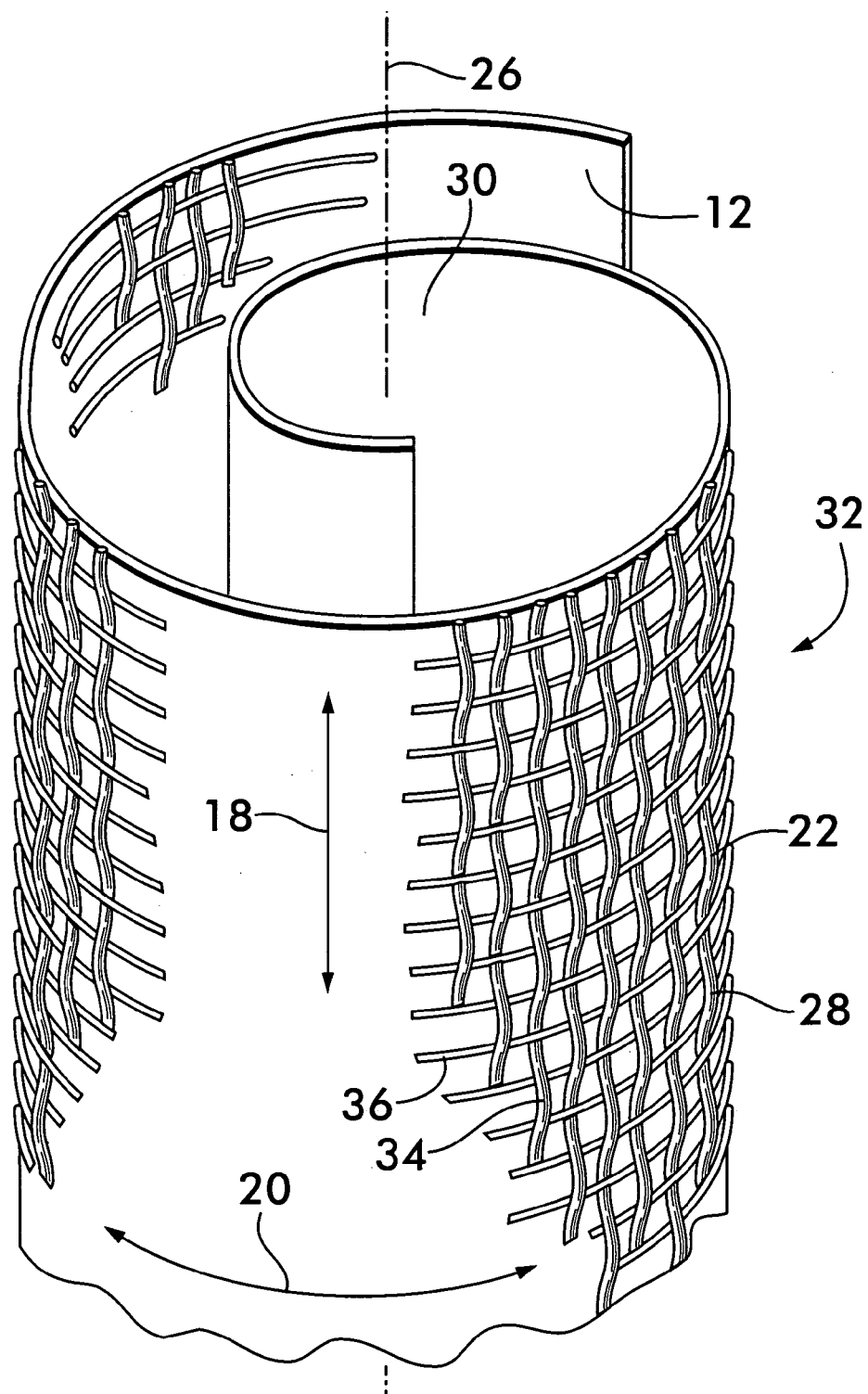
FIG. 11 is a perspective view of another embodiment of a self-curling sleeve.

Another embodiment of a self-curling sleeve 32 according to the invention is shown in FIG. 11. Self-curling sleeve 32 comprises a substrate 12 woven from monofilaments 34 that extend in the warp direction 18 and monofilaments 36 that extend in the weft direction 20.

As described for the previous embodiment having both monofilaments and multifilament yarns, substrate 12 can be induced to curl about an axis 26 through the use of a twill or satin weave pattern that creates an imbalance between the surfaces of the substrate. Again, warp faced or filling faced substrates are advantageous.

The strength and degree of curl can be further augmented by appropriate choice of the monofilaments 34 and 36 comprising the substrate 12. For example, to induce or augment the curl about axis 26 when it is oriented in the warp direction 18, monofilaments 34, oriented parallel to the warp direction 18, are chosen that have a larger diameter than the monofilaments 36 oriented in the fill direction 20. The larger diameter monofilaments 34 have a greater area moment of inertia than the smaller diameter monofilaments 36 and, for filaments having the same elastic modulus, have greater bending stiffness. The less stiff monofilaments 36 bend more easily and thus allow the substrate to curl around the axis 26 due to the imbalance engendered by the floats. Monofilaments having diameters between about 0.001 inches to about 0.020 inches provide practical filaments for forming self-curling sleeves according to the invention.

Practical examples have been made which exhibit strong curling force. Some examples include a substrate comprising warp monofilaments made of polyphenylene sulfide (PPS) and having a diameter of about 0.010 inches woven with dual (side by side) PPS fill monofilaments having a diameter of about 0.008 inches. In another example, warp monofilaments of polyester having a diameter of about 0.010 inches were woven with polyester fill monofilaments having a diameter of about 0.006 inches.

It is also possible to augment or control the curling through varying the material of the monofilaments used in the warp direction as compared with that of the fill direction. Varying the material allows the designer to vary the modulus of elasticity of the monofilament. By using material having a higher or lower elastic modulus in monofilaments extending in one direction or the other, the curling tendency can be augmented or reduced, and fine tuning of the curl can be achieved in conjunction with the weave pattern and the relative diameter of the monofilaments. For example, to increase the curl about the warp axis, fill monofilaments having a relatively lower modulus would be used to make the fill monofilaments more flexible than the warp monofilaments. Similarly, if it were desired to weaken the curling tendency about the warp axis, fill monofilaments having a greater modulus would be used.

Many materials are feasible for use as monofilaments in self-curling sleeves according to the invention. The materials include poly(ethylene terephthalate) (PET, a type of polyester), nylon 6 and nylon 6,6, silver coated nylon, olefins, aramids such as Nomex®, which is a registered trademark of E. I. du Pont de Nemours and Company of Wilmington, Del., and Kevlar®, which is a registered trademark of E. I. du Pont de Nemours and Company of Wilmington, Del., poly(ether ether ketone) (PEEK), modacrylic, glass fibers, carbon fibers, acrylic fibers, spandex, rayon, acetate, poly(lactic acid) (PLA), poly(ethylene naphthalate) (PEN, a type of polyester), melamine (Basofil®, which is a registered trademark of BASF Aktiengesellschaft of Germany), fluorocarbons, as well as natural fibers such as cotton.

A further feature is the addition of heat to the sleeve. For certain materials the application of heat will induce further curling and also provide a thermosetting action that will hold the sleeve in its further curled configuration.

FIG. 12 shows a weave pattern matrix that schematically depicts a twill weave. The twill weave shown is characterized by the chevron pattern of the warp monofilament cross-over points being oriented in the fill direction. The cross-over points are indicated by the "X" at various intersections of warp and fill monofilaments. Note again, the columns represent the warp monofilaments and the rows represent the fill monofilaments. The chevron pattern is not continued to the edge of the substrate (columns 11 and 12) where a basket weave is introduced to produce a clean edge.

FIG. 13 describes a twill weave wherein the chevron pattern is oriented along the warp direction.

Figure 15:
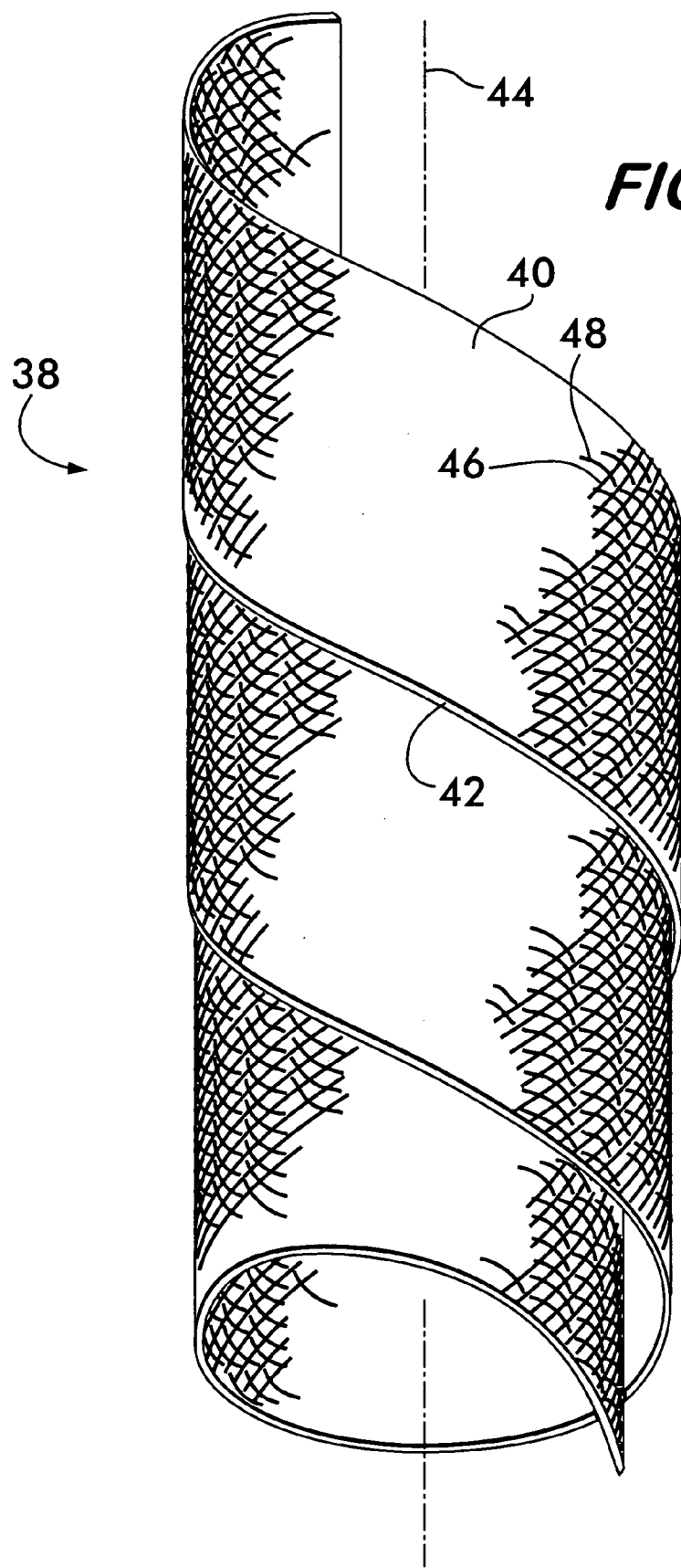
FIG. 15 is a perspective view of another embodiment of the self-curling sleeve according to the invention, and corresponding to the weave pattern of FIG. 14.

FIG. 14 illustrates yet another practical curl inducing weave pattern wherein the warp monofilament cross over points, indicated by the "X" symbols running diagonally to both the warp and fill directions of the substrate. This pattern produces a self-curling sleeve embodiment 38 as shown in FIG. 15, wherein the substrate 40 curls into a helix 42 around the longitudinal axis 44 of the sleeve. The monofilaments comprising the warp elements 46 and fill elements 48 of the sleeve are oriented at an angle to the axis 44. It is further noted that the weave patterns illustrated in any of the diagrams in FIGS. 4–10 and 12–14 may be used with any combination of monofilament or monofilament-multifilament forming a substrate.

Although examples of woven substrates are provided, it is also recognized that self-curling sleeves can also be made through weft insertion of filaments during warp knitting, or also by warp knitting alone, to produce the imbalance necessary to induce the substrate to curl.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A self-curling sleeve, comprising a substrate woven from a plurality of monofilaments and multifilament yarns, said monofilaments being oriented along a first direction and said multifilament yarns being oriented along a second direction substantially perpendicular to said first direction, said monofilaments and said multifilament yarns being woven such that said monofilaments form floats predominantly on one side of said substrate, said substrate curling about an axis parallel to said monofilaments to define and surround a central space, said one side having said floats facing outwardly away from said central space.

2. A self-curling sleeve according to claim 1, wherein said monofilaments are oriented in a warp direction along said substrate.

3. A self-curling sleeve according to claim 1, wherein said monofilaments and said multifilament yarns are woven in a herringbone twill weave.

4. A self-curling sleeve according to claim 3, wherein said monofilaments and said multifilament yarns are woven in a double cloth herringbone twill weave.

5. A self-curling sleeve according to claim 1, wherein said monofilaments and said multifilament yarns are woven in a satin weave.

6. A self-curling sleeve, comprising a substrate woven from a plurality of monofilament warp members and multifilament weft yarns, said warp members being oriented along a warp direction and said weft yarns being oriented along a weft direction, said warp members and weft yarns being woven in a herringbone twill weave wherein said warp members form floats on one side of said substrate, said substrate curling about an axis parallel to said warp direction to define and surround a central space, said one side having said floats facing outwardly away from said central space.

7. A self-curling sleeve, comprising a substrate woven from a plurality of monofilament warp members and multifilament weft yarns, said warp members being oriented along a warp direction and said weft yarns being oriented along a weft direction, said warp members and weft yarns being woven in a satin weave wherein said warp members form floats on one side of said substrate, said substrate curling about an axis parallel to said warp direction to define and surround a central space, said one side having said floats facing outwardly away from said central space.

8. A self-curling sleeve, comprising a substrate woven from a plurality of monofilament warp members and multifilament weft yarns, said warp members being oriented along a warp direction and said weft yarns being oriented along a weft direction, said warp members and weft yarns being woven in a double cloth herringbone twill weave wherein said warp members form floats on one side of said substrate, said substrate curling about an axis parallel to said warp direction to define and surround a central space, said one side having said floats facing outwardly away from said central space.

9. A self-curling sleeve, comprising a substrate woven from a plurality of first monofilaments having a first diameter and a plurality of second monofilaments having a second diameter, said first monofilaments being oriented along a first direction and said second monofilaments being oriented along a second direction substantially perpendicular to said first direction, said first and second monofilaments being woven such that said first monofilaments form floats predominantly on one side of said substrate, said substrate curling about an axis parallel to said first monofilaments to define and surround a central space, said one side having said floats facing outwardly away from said central space.

10. A self-curling sleeve according to claim 9, wherein said first monofilaments have a larger elastic modulus than said second monofilaments.

11. A self-curling sleeve according to claim 9, wherein said first monofilaments are oriented in a warp direction along said substrate, and wherein said first monofilaments have a larger diameter than said second monofilaments.

12. A self-curling sleeve according to claim 9, wherein said first monofilaments are oriented in a warp direction along said substrate, and wherein said first and second monofilaments are woven in a herringbone twill weave.

13. A self-curling sleeve according to claim 12, wherein said first and second monofilaments are woven in a double cloth herringbone twill weave.

14. A self-curling sleeve according to claim 9, wherein said first and second monofilaments are woven in a satin weave.

15. A self-curling sleeve, comprising a substrate woven from a plurality of first members and a plurality of second members, said first members being oriented along a first direction and said second members being oriented along a second direction substantially perpendicular to said first direction, said first and second members being woven such that said first members form floats predominantly on one side of said substrate, said substrate curling about an axis to define and surround a central space, said one side having said floats facing outwardly away from said central space.

16. A self-curling sleeve according to claim 15, wherein each of said first members is more rigid than each of said second members.

17. A self-curling sleeve according to claim 15, wherein each of said second members is more rigid than each of said first members.

18. A self-curling sleeve according to claim 15, wherein each warp member crosses over a respective weft member at a respective cross-over point, and wherein a plurality of the cross-over points are arranged to run diagonally to both the warp and weft directions of the substrate.

19. A self-curling sleeve according to claim 15, wherein the plurality of cross-over points are arranged in substantially parallel lines.

20. A self-curling sleeve according to claim 15, wherein each warp member and each weft member is oriented at an acute angle relative to the axis.

21. A self-curling sleeve according to claim 15, wherein the substrate curls into a helix around the axis.

22. A self-curling sleeve according to claim 15, wherein each of said plurality of first members comprises a monofilament, and wherein each of said plurality of second members comprises a monofilament.

23. A self-curling sleeve according to claim 22, wherein said each of said plurality of first members has a first diameter, each of said plurality of second members has a second diameter, said first diameter being larger than second diameter.

24. A self-curling sleeve according to claim 22, wherein said each of said plurality of first members has a larger elastic modulus than each of said plurality of second members.

25. A self-curling sleeve according to claim 15, wherein each of said plurality of first members comprises a monofilament, and wherein each of said plurality of second members comprises a multifilament yarn.

* * * * *